J. WOODS.
COMBINED BREAD AND CARVING BOARD CASE.
APPLICATION FILED SEPT. 12, 1921.
1,403,883.
Patented Jan. 17, 1922.
2 SHEETS—SHEET 1.
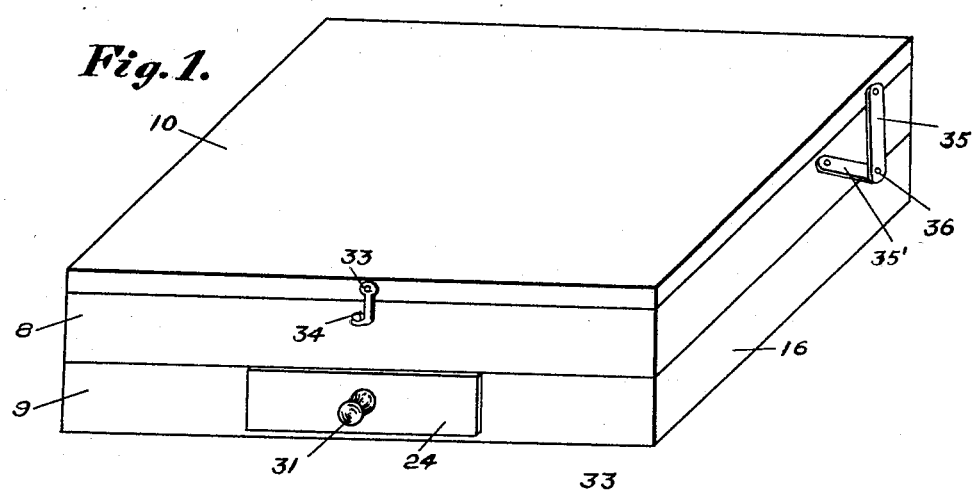
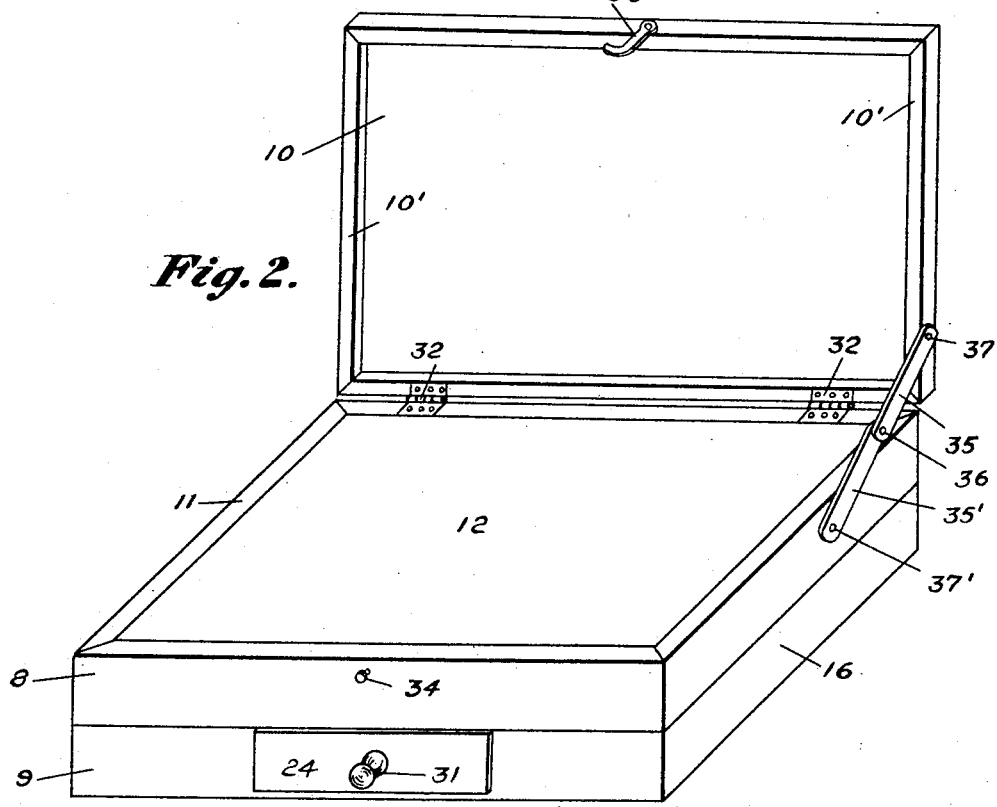
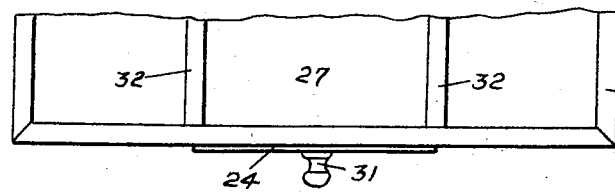
INVENTOR
Joseph Woods
BY
Rich & Manning
ATTORNEY J. WOODS.
COMBINED BREAD AND CARVING BOARD CASE.
APPLICATION FILED SEPT. 12, 1921.

1,403,883.

Patented Jan. 17, 1922.
2 SHEETS—SHEET 2.

INVENTOR
Joseph Woods
BY
Richd H Manning
ATTORNEY

UNITED STATES PATENT OFFICE.

JOSEPH WOODS, OF KANSAS CITY, KANSAS.

COMBINED BREAD AND CARVING BOARD CASE.

1,403,883.  Specification of Letters Patent.  Patented Jan. 17, 1922.

Application filed September 12, 1921. Serial No. 499,929.

*To all whom it may concern:*

Be it known that I, JOSEPH WOODS, a citizen of the United States of America, residing at Kansas City, in the county of Wyandotte and State of Kansas, have invented certain new and useful Improvements in Combined Bread and Carving Board Cases; and I do hereby declare that the following is a full, clear, and exact description of the invention, reference being had to the accompanying drawings, forming a part of this specification.

The object of the invention primarily is a case within which the cutting of bread and cake and the carving of meats may be successively performed economically and a sanitary article provided for immediate use.

Second: To combine separate bread cutting and meat carving boards in foldable positions.

Third: To collect the juices from the meats on the carving board during the carving operation, and Fourth: A portable case for the meat cutting and bread carving utensils.

The invention consists in the novel construction and combination of parts which will be first fully described and then specifically pointed out in the claims.

In the drawings,

Figure 1, is a view in perspective of the case with its respective parts in a closed position.

Figure 2, is a view of the case as seen in Fig. 1, with the hinged cover in an open position and showing the bread cutting board forming a part of the upper section.

Figure 5, is a view in plan, taken of the front portion of the lower section from beneath.

Similar numerals of reference indicate corresponding parts in all the figures of the drawings.

Figure 3:
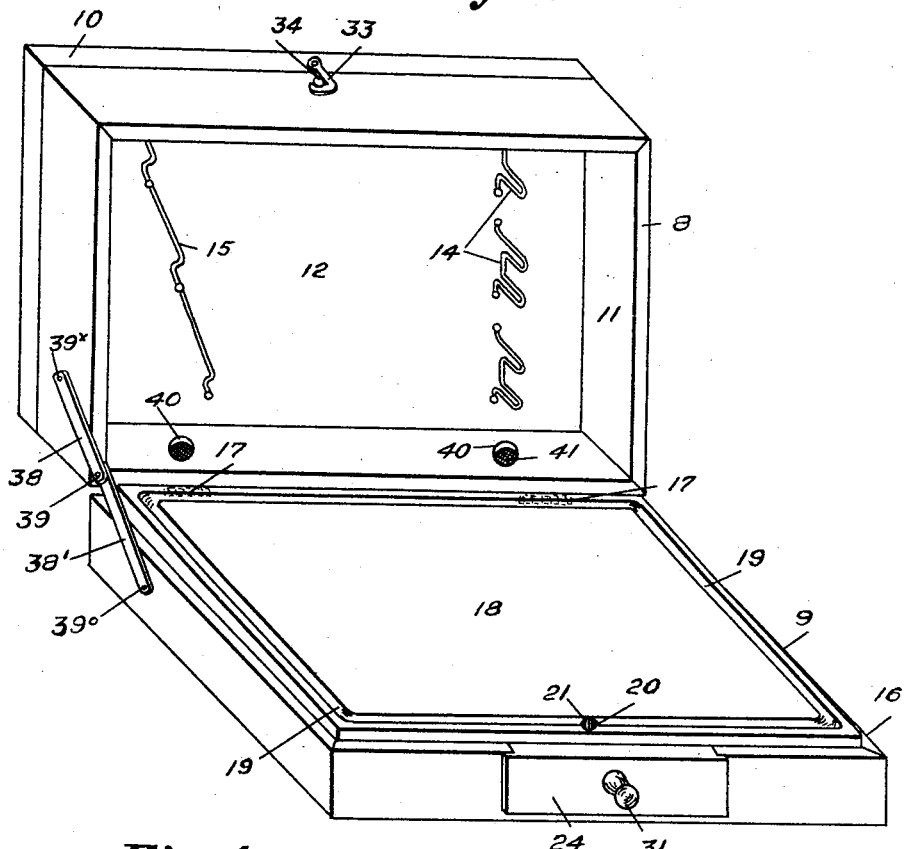
Figure 3, is a view in perspective of the upper and lower hinged sections of the case showing the inner side of the bread board on the upper section and the racks for the bread and meat cutting implements, also showing the meat carving board on the lower section and the drain conduit and the combination drawer for the meat juices and utensils in a closed position.
Figure 4:
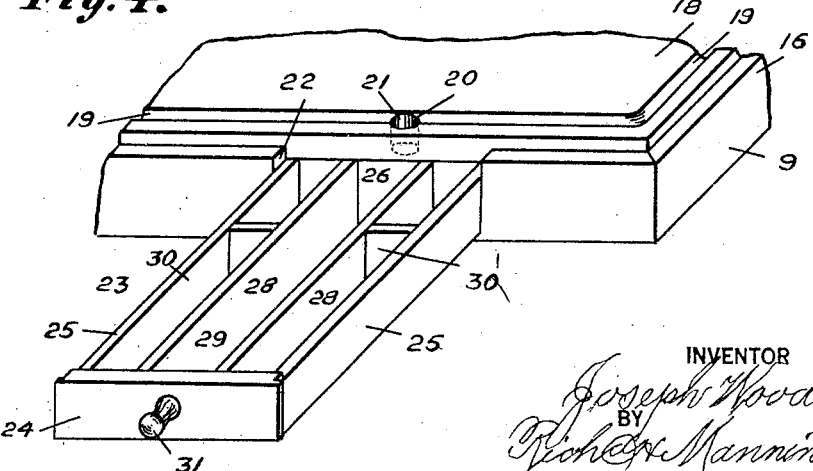
Figure 4, is a broken section in perspective of the lower section of the case showing the drawer in an open position and the separate compartments for the meat juices and utensils and the drain conduit leading from the meat cutting board to the compartment in the drawer for the meat juices.

Referring to the drawings 7, indicates a complete case enclosing the essential parts of the invention, and which consists of an upper section or member 8, and a lower section, or member 9, and a cover 10 hinged to the section 8.

The section 8 consists of a rectangular shaped frame 11, preferably of a convenient size for household use, although this is immaterial, and larger frames employed when necessary.

Within the upper portion of the frame 11, of section 8, is a flat board 12 of equal proportion to the interior dimensions of the frame, the upper surface of the board being flush with the upper horizontal surfaces of said frame, and constitutes the bread board.

The board 12 is connected rigidly with the inner surface of the frame 11 in any suitable manner.

To the lower surface of the bread board, are connected the racks 14 and 15 for holding the utensils usually employed in meat carving operations, such as knives and meat saws. For this purpose the width of frame permits of the attachment of any kind of bracket to the board 12, best adapted to support the knives or saws.

The lower section 9 consists of a rectangular frame 16, of the same size as the frame 11, and said frame 11 is hinged by the hinges 17—17 to the said frame 16.

Within the frame 16, is fitted the rectangular board 18, the outer edges of the board extending upwardly a short distance as seen at 19 above the plane of the upper surface of the frame 16.

In the upper surface of the carving board, a short distance inwardly from its outer edges, is a conduit or groove 19, extending along both ends of the boards and parallel therewith, and also along the forward and rear longitudinal portions of said board, and communicating with each other.

An opening 20 is made in the forward portion of the carving board 18, extending from the bottom of groove 19, in which is secured a drain tube 21, the lower end of the tube extending a slight distance below the line of the lower surface of said carving board.

In the forward end of frame 16, is a drawer opening 22, of about one third the width of the frame and extending downwardly to within a slight distance of the lower edge of said forward portion of said frame, and within said opening is a drawer 23. This drawer is provided with a front member 24, side members 25—25, a rear end member 26, and a bottom member 27—see Fig. 5.

Between the side members 25—25 are separate partitions 28—28 connected rigidly at their ends with the inner surface of the respective front and rear members 24 and 26, and spaced equal distances apart from each other and said side members 25—25 and extending downwardly to the bottom member 27. Between said side members 28—28 is formed the drainage receptacle 29, for the juices of the meats and is preferably lined with aluminum plate so as to hold the juices from being absorbed by the walls of the drawer.

The outer space 30 of the drawer are provided with cross division boards 31—31 in the direction of their rear ends. In these spaces are kept the usual carving utensils. Upon the forward plate 24 of the drawer is a knob 31.

When the drawer is closed, the forward portion of the drain receptacle 29 is immediately below the lower end of the drain tube 21.

The drawer is slidingly supported by guide bars 32 extending from the forward end member of the frame 16, to the rear end member as seen in Fig. 5.

The cover 10 consists of a flat board secured in any suitable manner to a narrow rectangular frame 10' which is of the same dimensions as the cover, and when the cover is in a closed position, lies upon the upper surface of the rectangular frame 11 of section 8 of the case.

The rear longitudinal portion of the frame 10' of the cover 10 is hinged at 32—32 to the upper portion of the rear longitudinal portion of frame 11 of section 8, and is secured by a hook 33 on the forward portion of frame 10' of the cover, to a pin on the frame 11 of section 8.

For the purpose of retaining the cover in an open position, bars 35—35' are pivoted together at 36 and their outer ends pivoted at 37—37' respectively to the outer surface and lower end portion of frame 10' of cover 10 and also to the end 11 of the frame 16 of section 8, and which bars form a brace when extended and fold together upon the closing of the cover.

Similar bars 38—38' pivoted together at 39, one bar 38 being connected pivotally at 39× to the outer surface and left hand end of frame 11 of section 8, and the other bar 38' to the end member of frame 16 of section 9 of the case at 39°. In the rear portion of frame 11 are openings 40—40 having wire screens 41. Upon releasing hook 33 on the cover 10, from pin 34, the cover is raised from its closed position to the position seen in Fig. 2, supported by the brace bars 35—35'.

In this position of the cover, the bread board 12 is exposed for use in the bread cutting operations. As soon as sufficient slices of bread are obtained, the crumbs are removed and the cover lowered in position and hooked to section 8.

Section 8, with the cover 10, is then raised in position from section 9 into the position seen in Fig. 3 exposing the meat carving board 18 and which section is held by the pivoted bars 38—38'. The meat which is placed on the carving board is afforded in my invention a protected carving surface which, when ready for carving operations, has been kept closed from the insanitary surroundings. During the carving of the meats, the juices upon the board pass to the grove 19 in the outer portions and as the amount accumulates, enter the drain tubes 21, and pass to the section 29 of the drawer 23. In this manner, large quantities of meat may be carved in a short time, with economy in labor and the saving of the juices in the form of gravy made practicable while the carving operation proceeds.

Upon the closing of the section 8, after the carving board has been subjected to a high degree of heat the moisture from evaporation from the carving board is permitted to escape through the screened openings 40 in the frame 11 of section 8 and as well as heat from the juices in drawer 23 through tube 21.

The bread cutting and meat carving boards in my invention are combined for the advantages of rapid operations in culinary departments and affords an economy in time and labor in serving food or in any other use to which the invention may be applied.

Having fully described my invention what I now claim as new and desire to secure by Letters Patent is, 1. A case for culinary articles consisting of separate upper and lower frames hinged together, one frame carrying an upper board and the lower frame a lower board for carving meats, a closure to the bread board comprising a frame and a board carried by the frame, said frame being hinged to the frame carrying the bread board, and means for supporting said frames in their open positions respectively.

2. A case for culinary articles consisting of separate upper and lower frames hinged together and boards carried within each of said frames, said lower frame having a drawer opening and a drawer therein, and said lower board having a tube leading to the drawer and said upper frame having ventilating openings and screens therein.

JOSEPH WOODS.